United States Patent
Eichenauer et al.

(10) Patent No.: US 6,569,951 B2
(45) Date of Patent: May 27, 2003

(54) ELASTIC-THERMOPLASTIC GRAFT POLYMERS PREPARED BY MULTI-STAGE FREE RADICAL POLYMERIZATION

(75) Inventors: Herbert Eichenauer, Dormagen (DE); Hans-Erich Gasche, Bergamo (IT); Ulrich Jansen, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/967,311

(22) Filed: Sep. 28, 2001

(65) Prior Publication Data

US 2002/0115787 A1 Aug. 22, 2002

(30) Foreign Application Priority Data

Oct. 6, 2000 (DE) .......................... 100 49 467

(51) Int. Cl.$^7$ .............................. C08F 279/04
(52) U.S. Cl. .................... 525/310; 525/316; 525/69; 525/263
(58) Field of Search ................ 525/310, 316, 525/69, 263

(56) References Cited

U.S. PATENT DOCUMENTS

| | | | |
|---|---|---|---|
| 4,652,614 A | 3/1987 | Eichenauer et al. | 525/71 |
| 4,877,844 A | 10/1989 | Kishida et al. | 525/316 |
| 6,376,605 B1 * | 4/2002 | Sugimoto et al. | 525/316 |

* cited by examiner

Primary Examiner—James J. Seidleck
Assistant Examiner—Olga Asinovsky
(74) Attorney, Agent, or Firm—Joseph C. Gil; James R. Franks

(57) ABSTRACT

An elastic-thermoplastic graft polymer prepared by a multi-stage free radical polymerization is described. The elastic-thermoplastic graft polymer is prepared by polymerizing (i) one or more monomers containing vinyl groups, and (ii) at least one molecular weight regulating compound, in the presence of (iii) at least one rubber in latex form. The ratio of monomers (M) to the molecular weight regulating compound (MWR) is altered throughout the various stages of the polymerization method. The M:MWR ratio is: from 50:1 to 400:1 in the first stage; from 100:1 to 800:1 in the second stage; and from 200:1 to 2000:1 in the third stage of the polymerization. In at least one further reaction stage of the polymerization, the monomers, in the absence of the molecular weight regulating compound, are polymerized in the presence of the rubber. This further reaction stage occurs before the first stage and/or after the third stage of the polymerization. The multi-stage polymerization is conducted such that: M:MWR (first stage)≦M:MWR (second stage)<M:MWR (third stage). Also described are compositions comprising the elastic-thermoplastic graft polymer, and shaped articles prepared from such compositions.

12 Claims, No Drawings

ELASTIC-THERMOPLASTIC GRAFT POLYMERS PREPARED BY MULTI-STAGE FREE RADICAL POLYMERIZATION

CROSS REFERENCE TO RELATED PATENT APPLICATION

The present patent application claims the right of priority under 35 U.S.C. 119 (a)–(d) of German Patent Application No. 100 49 467.6, filed Oct. 6, 2000.

FIELD OF THE INVENTION

The invention provides improved elastic-thermoplastic graft polymers which are obtained by emulsion polymerization adhering to specific reaction conditions during the addition of compounds which regulate the molecular weight. The present invention also relates to thermoplastic compositions and shaped articles comprising the elastic-thermoplastic graft polymers, and a process for the preparation of the elastic-thermoplastic graft polymers.

BACKGROUND OF THE INVENTION

The preparation of elastic-thermoplastic graft polymers, e.g. of graft rubbers from vinyl monomers and rubbers, by emulsion polymerization is known and is described in numerous patent specifications, e.g., EP-A 154 244.

One or more compounds which regulate the molecular weight are often added during the grafting polymerization reaction to improve the graft polymer properties in respect of more favorable processing conditions of thermoplastic molding compositions prepared therefrom.

The disadvantages of graft polymers prepared by such known polymerization methods include, the high costs of the compounds which regulate the molecular weight, and the less than optimum incorporation properties of these molecular weight regulating components.

SUMMARY OF THE INVENTION

There was therefore the object of providing elastic-thermoplastic graft polymers for the preparation of thermoplastic molding compositions, in which the compound which regulates the molecular weight has an optimum activity at a very high incorporation rate when a given amount is employed.

In accordance with the present invention, there is provided an elastic-thermoplastic graft polymer prepared by a multi-stage free radical polymerization of (i) one or more monomers containing vinyl groups, and (ii) at least one molecular weight regulating compound, in the presence of (iii) at least one rubber in latex form, wherein,
in a first reaction stage of the polymerization, the ratio of monomers to the molecular weight regulating compound is from 50:1 to 400:1;
in a second reaction stage of the polymerization, the ratio of monomers to the molecular weight regulating compound is from 100:1 to 800:1;
in a third reaction stage of the polymerization, the ratio of monomers to the molecular weight regulating compound is from 200:1 to 2000:1; and
in at least one further reaction stage of the polymerization, the monomers, in the absence of the molecular weight regulating compound, are polymerized in the presence of the rubber, said further reaction stage occurring at a point selected from at least one of before the first stage and after the third stage,
provided that the ratio of monomers to the molecular weight regulating compound in the first stage is less than or equal to the ratio of monomers to the molecular weight regulating compound in the second stage, and the ratio of monomers to the molecular weight regulating compound in the second stage is less than the ratio of monomers to the molecular weight regulating compound in the third stage.

Other than in the operating examples, or where otherwise indicated, all numbers expressing quantities of ingredients, reaction conditions, etc. used in the specification and claims are to be under stood as modified in all instance by the term "about."

DETAILED DESCRIPTION OF THE INVENTION

The duration of the three successive reaction sections here is preferably 10 to 80%, particularly preferably 15 to 70% and very particularly preferably 20 to 60% (first reaction section), preferably 5 to 60%, particularly preferably 10 to 50% and very particularly preferably 15 to 40% (second reaction section), and preferably 10 to 50%, particularly preferably 15 to 45% and very particularly preferably 20 to 40% (third reaction section) (in each case based on the total reaction time of the three reaction sections). The duration of the reaction section without addition of compounds which regulate the molecular weight at the beginning and/or at the end of the grafting polymerization reaction is preferably 5 to 50%, particularly preferably 10 to 45% and very particularly preferably 15 to 40% (based on the total reaction time of the grafting polymerization).

Compared with the elastic-thermoplastic graft polymers known to date, the polymers according to the invention are distinguished by an improved processability and a higher toughness of the rubber-modified thermoplastic molding compositions based thereon, e.g. of the ABS type.

Suitable rubbers used in the preparation of the elastic-thermoplastic graft polymers according to the invention are selected from those rubber-like polymers present in emulsion form which have a glass transition temperature below 0° C.

Classes of preferred rubbers which may be used in the preparation of the elastic-thermoplastic graft polymers according to the invention include diene rubbers and/or acrylate rubbers.

As used herein the term "diene rubbers" refers to homopolymers of conjugated dienes having 4 to 8 C atoms, such as butadiene, isoprene or chloroprene, or copolymers thereof with up to 60 wt. %, preferably up to 30 wt. %, of a vinyl monomer. Examples of vinyl monomers include, but are not limited to acrylonitrile, methacrylonitrile, styrene, α-methylstyrene, halogenostyrenes, $C_1$–$C_4$-alkylstyrenes, $C_1$–$C_8$-alkyl acrylates, $C_1$–$C_8$-alkyl methacrylates, alkylene glycol diacrylates, alkylene glycol dimethacrylates and divinylbenzene.

Acrylate rubbers that may be used include homo- and copolymers of $C_1$–$C_{10}$-alkyl acrylates, e.g. and preferably homopolymers of ethyl acrylate or butyl acrylate or copolymers with up to 40 wt. %, preferably not more than 10 wt. %, of vinyl monomers, e.g. and preferably styrene, acrylonitrile, vinyl butyl ether, acrylic acid (esters), methacrylic acid (esters) or vinylsulfonic acid. Those acrylate rubber homo- or copolymers which comprise 0.01 to 8 wt. % of divinyl or polyvinyl compounds and/or N-methylolacrylamide or N-methylolmethacrylamide or other compounds which act as crosslinking agents, e.g., divinylbenzene or triallyl cyanurate, are preferably employed.

Preferred rubbers include polybutadiene rubbers, SBR rubbers with up to 30 wt. % of polymerized-in styrene or acrylate rubbers, in particular those which have a core-shell structure, e.g., as described in DE-A 3 006 804, or mixtures of the rubbers mentioned.

Latices with average particle diameters ($d_{50}$) of 0.05 to 2 μm, preferably 0.08 to 1 μm and particularly preferably 0.1 to 0.5 μm, may be used in the preparation of the graft polymers according to the invention. The gel contents of the rubbers employed can be varied within wide limits, and are preferably between 30 and 95 wt. %. The gel contents being determined by means of a wire cage method in toluene as described in, for example, Houben-Weyl, Methoden der Organischen Chemie, Makromolekulare Stoffe, part 1, p.307 (1961), Thieme Verlag Stuttgart.

Mixtures of rubber latices (or latexes) having different $d_{50}$ values are particularly preferred. In an embodiment of the present invention, a mixture of rubber latices (a) and (b) are used. Rubber latex (a) has average particle diameters $d_{50}$ of $\leq 320$ nm, preferably 260 to 310 nm, and gel contents of $\leq 70$ wt. %, preferably 40 to 65 wt. %. Rubber latex (b) has average particle diameters $d_{50}$ of $\geq 370$ nm, preferably 380 to 450 nm, and gel contents of $\geq 70$ wt. %, preferably 75 to 90 wt. %.

Preferably, the particle size distribution range of rubber latex (a) is 30 to 100 nm, particularly preferably 40 to 80 nm, and that of rubber latex (b) is 50 to 500 nm, particularly preferably 100 to 400 nm (in each case measured as the $d_{90}$–$d_{10}$ value from the integral particle size distribution). The average particle diameters are determined by means of an ultracentrifuge, as described in, for example, cf. W. Scholtan, H. Lange: Kolloid-Z. u Z. Polymer 250, p. 782–796 (1972).

The mixtures preferably comprise rubber latices (a) and (b) in a weight ratio of 90:10 to 10:90, particularly preferably 60:40 to 30:70 (in each case based on the particular solids content of the latices).

The rubber latices used can be prepared by emulsion polymerization, using reaction conditions, auxiliaries and working techniques that are well known to the skilled artisan.

It is also possible first to prepare a finely divided rubber polymer by known methods and then to agglomerate this in an art-recognized manner to establish the required particle size. Relevant techniques are described in, for example, EP-A 0 029 613; EP-A 0 007 810; DD-A 144 415; DE-A 12 33 131; DE-A 12 58 076; DE-A 21 01 650 and U.S. Pat. No. 1,379,391.

The so-called seed polymerization technique in which, for example, a finely divided butadiene polymer is first prepared and is then polymerized further to larger particles by further reaction with butadiene-containing monomers can also be used.

Emulsifiers which can be used include the conventional anionic emulsifiers, such as alkyl sulfates, alkylsulfonates, aralkylsulfonates or soaps of saturated or unsaturated fatty acids (e.g., oleic acid or stearic acid) and of alkaline disproportionated or hydrogenated abietic or tall oil acid, and emulsifiers with a carboxyl group (e.g., salts of $C_{10}$–$C_{18}$-fatty acids, disproportionated abietic acid or emulsifiers according to DE-A 36 39 904 and DE-A 39 13 509) are preferably employed.

Rubber polymer latices useful in the present invention may also be prepared by emulsification of finished rubber polymers in aqueous media, for example as described in Japanese Patent Application JP-A 55 125 102.

Suitable grafting monomers which are polymerized in the presence of the rubber-like polymers present in emulsion form include compounds which can be polymerized in emulsion to give thermoplastic resins, such as vinylaromatics of the formula (I) or compounds of the formula (II) or mixtures thereof,

in which
$R^1$ represents hydrogen or methyl,
$R^2$ represents hydrogen, halogen or alkyl having 1 to 4 carbon atoms in the ortho-, meta- or para-position,
$R^3$ represents hydrogen or methyl and
X represents —CN, $R^4$OOC— or $R^5R^6$NOC—,
  wherein
  $R^4$ denotes hydrogen or alkyl having 1 to 4 carbon atoms; and
  $R^5$ and $R^6$ independently of one another denote hydrogen, phenyl or alkyl having 1 to 4 carbon atoms.

Examples of compounds of the formula (I) include styrene, α-methylstyrene, p-methylstyrene and vinyltoluene. Compounds of the formula (II) include acrylonitrile and methyl methacrylate. Further suitable monomers which may be used include vinyl acetate and N-phenylmaleimide.

Preferred monomers include mixtures of styrene and acrylonitrile, α-methylstyrene and acrylonitrile, of styrene, acrylonitrile and methyl methacrylate, and combinations of these monomer mixtures with N-phenylmaleimide.

Preferred graft polymers according to the invention include those which are obtained by the grafting polymerization of styrene and acrylonitrile in a weight (wt.) ratio of 90:10 to 50:50, preferably 80:20 to 65:35 (wherein all or some of the styrene can be replaced by α-methylstyrene or methyl methacrylate), in the presence of amounts of rubber, preferably polybutadiene. The resulting graft polymers typically have rubber contents of 30 to 80 wt. %, preferably 35 to 75 wt. % and particularly preferably 35 to 70 wt. %, based on the total weight of the graft polymer.

Initiators that may be used in the preparation of the graft polymers include inorganic and organic peroxides, e.g., $H_2O_2$, di-tert-butyl peroxide, cumene hydroperoxide, dicyclohexyl percarbonate, p-menthane hydroperoxide and tert-butyl hydroperoxide, azo initiators, such as azobisisobutyronitrile, organic per-salts, such as potassium peroxo-disulfate, sodium peroxodisulfate, ammonium peroxodisulfate, potassium perphosphate and sodium perborate. Redox systems may also be used, which, as is known to the skilled artisan, are typically composed of an oxidizing agent and a reducing agent. Optionally, heavy metal ions may additionally be present in the reaction medium (see, for example, H. Logemann in Houben-Weyl, Methoden der Organischen Chemie, vol. 14/1, p. 263–297).

Preferred initiators include potassium peroxodisulfate, sodium peroxodisulfate, ammonium peroxodisulfate or mixtures thereof and cumene hydroperoxide, p-menthane hydroperoxide, tert-butyl hydroperoxide or mixtures thereof.

Reducing agents which may be used to prepare the graft polymers of the present invention are preferably water-soluble compounds having a reducing action, preferably chosen from salts of sulfinic acid, salts of sulfurous acid, sodium dithionite, sodium sulfite, sodium hyposulfite, sodium hydrogen sulfite, ascorbic acid and salts thereof, Rongalit C (sodium formaldehyde-sulfoxylate), mono- and dihydroxyacetone and sugars (e.g. glucose or dextrose). Transition metal salts may also be used, for example iron (II) salts, such as e.g. iron (II) sulfate, tin (II) salts, such as e.g. tin (II) chloride, or titanium (III) salts, such as titanium (III) sulfate. In a preferred embodiment of the present invention, the elastic-thermoplastic graft polymer is prepared in the substantial absence of such transition metal salts.

Particularly preferred reducing agents include dextrose, ascorbic acid (salts) or sodium formaldehyde-sulfoxylate (Rongalit C).

The reaction temperature in the preparation of the graft polymers according to the invention can be varied within wide limits. It is in general 25° C. to 160° C., preferably 40° C. to 90° C. and particularly preferably 50° C. to 85° C. The grafting polymerization here is preferably carried out such that the temperature difference between the beginning and end of the reaction is at least 10° C., particularly preferably at least 15° C. and very particularly preferably at least 20° C.

In the preparation of the elastic-thermoplastic graft polymers according to the invention, 0.01 to 1.00 part by wt. (per 100 parts by wt. of grafting monomer), preferably 0.03 to 0.8 part by wt. (per 100 parts by wt. of grafting monomer) and particularly preferably 0.06 to 0.5 part by wt. (per 100 parts by wt. of grafting monomer) of one or more mercaptans are used as the moleculare weight regulating compound together with the grafting monomers.

Examples of suitable mercaptans include, but are not limited to: aliphatic mercaptans, such as ethyl-, n-propyl-, n-butyl-, tert-butyl-, n-pentyl-, n-hexyl-, n-octyl-, n-decyl-, n-dodecyl-, tert-dodecyl-, n-hexadecyl- and n-octadecylmercaptan; and aromatic mercaptans, such as thiophenol. Preferred mercaptans include tert-dodecylmercaptan and n-dodecylmercaptan and mixtures thereof.

Other substances which regulate the molecular weight, such as dimeric α-methylstyrene or terpinols, may also be employed in amounts of 0.5 to 5 parts by wt, preferably 1 to 3 parts by wt. (in each case per 100 parts by wt. of grafting monomer).

For the preparation of elastic-thermoplastic graft polymers with the improved properties according to the invention, during the grafting polymerization reaction a mixture of monomer(s) (M) and compound which regulates the molecular weight (MWR) must be added to the rubber latex such that the weight ratio of M:MWR in a first reaction section or stage (RS) is 50:1 to 400:1, preferably 75:1 to 350:1 and particularly preferably 100:1 to 300:1, in a second reaction section is 100:1 to 800:1, preferably 150:1 to 700:1 and particularly preferably 200:1 to 600:1, and in a third reaction section is 200:1 to 2,000:1, preferably 300:1 to 1,800:1 and particularly preferably 400:1 to 1,500:1. In at least one further reaction section at the beginning and/or at the end of the grafting polymerization reaction, preferably at the end of the grafting polymerization reaction, only monomers are added to the rubber latex, without the addition of compounds which regulate the molecular weight. The multi-stage graft polymerization reaction is conducted such that: M:MWR (first RS)≦M:MWR (second RS)<M:MWR (third RS).

The present invention also provides elastic-thermoplastic graft polymers obtained using sulfur-containing compounds which regulate the molecular weight, preferably mercaptans, adhering to the reaction conditions described above, characterized by a non-homogeneous content of incorporated sulfur. This non-homogeneous incorporation of sulfur may be detectable by fractional precipitation of the elastic-thermoplastic graft polymer or of the soluble polymer content which is not grafted on, and analytical determination of the sulfur content of the individual fractions (for example as described in M. Hoffmann, H. Krömer, R. Kuhn in Polymeranalytik I, p. 147–168, Thieme Verlag Stuttgart 1977).

The elastic-thermoplastic graft polymers according to the invention preferably have a rubber content of 30 to 80 wt. %, particularly preferably 35 to 75 wt. %.

To produce rubber-modified thermoplastic molding compositions, the graft polymer according to the invention present after conventional working up (e.g., by coagulation with salts and/or acids, washing and drying or by spray drying) is mixed with at least one rubber-free matrix resin.

Rubber-free copolymers which are preferably used are copolymers of styrene and acrylonitrile in a weight ratio of 95:5 to 50:50, it being possible for all or some of the styrene and/or acrylonitrile to be replaced by α-methylstyrene, methyl methacrylate or N-phenylmaleimide. Copolymers with contents of incorporated acrylonitrile units of <30 wt. % are particularly preferred.

These rubber-free copolymers preferably have average molecular weights $\overline{M}_w$ of 20,000 to 200,000 (measured e.g. by gel permeation chromatography) or intrinsic viscosities [η] of 20 to 110 ml/g (measured in dimethylformamide at 25° C.).

Details for the preparation of these resins are described, for example, in DE-AS 2 420 358 and DE-AS 2 724 360. Vinyl resins prepared by bulk or solution polymerization have proved to be particularly suitable. The copolymers can be added by themselves or in any desired mixture.

In addition to thermoplastic resins built up from vinyl monomers, the use of polycondensates, e.g. aromatic polycarbonates, aromatic polyester-carbonates, polyesters or polyamides, as the rubber-free copolymer in the molding compositions according to the invention is also possible.

Suitable thermoplastic polycarbonates and polyester-carbonates that may be used include those known to the skilled artisan, for example as described in DE-AS 1 495 626, DE-A 2 232 877, DE-A 2 703 376, DE-A 2 714 544, DE-A 3 000 610, DE-A 3 832 396 and DE-A 3 077 934. Such suitable thermoplastic polycarbonates and polyester-carbonates can be prepared by reaction of diphenols represented by formulas (III) and (IV) with carbonic acid halides. Formulas (III) and (IV) are described in further detail as follows.

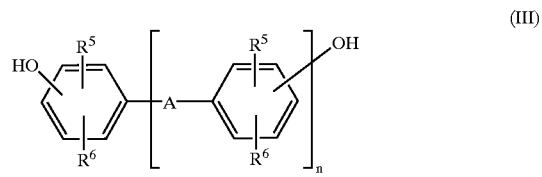

(III)

-continued

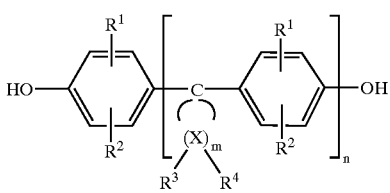

(IV)

wherein

A is a single bond, $C_1$–$C_5$-alkylene, $C_2$–$C_5$-alkylidene, $C_5$–$C_6$-cycloalkylidene, —O—, —S—, —SO—, —$SO_2$— or —CO—, $R^5$ and $R^6$ independently of one another represent hydrogen, methyl or halogen, in particular hydrogen, methyl, chlorine or bromine, $R^1$ and $R^2$ independently of one another denote hydrogen, halogen, preferably chlorine or bromine, $C_1$–$C_8$-alkyl, preferably methyl or ethyl, $C_5$–$C_6$-cycloalkyl, preferably cyclohexyl, $C_6$–$C_{10}$-aryl, preferably phenyl, or $C_7$–$C_{12}$-aralkyl, preferably phenyl-$C_1$–$C_4$-alkyl, in particular benzyl, m is an integer from 4 to 7, preferably 4 or 5, n is 1 or 1, $R^3$ and $R^4$ can be chosen individually for each X and independently of one another denote hydrogen or $C_1$–$C_6$-alkyl and X denotes carbon.

Carbonic acid halides, which are reacted with the diphenols represented by formulas (III) and (V), include phosgene, and/or with aromatic dicarboxylic acid dihalides, preferably benzenedicarboxylic acid dihalides. The reaction between the diphenol of formulas (III) and (IV) and the carbonic acid halides is typically performed by means of phase boundary polycondensation, or by polycondensation (in the case of phosgene) in a homogeneous phase (the so-called pyridine process), it being possible for the molecular weight to be adjusted in a known manner by introducing selected amounts of known chain terminators.

Suitable diphenols of the formulate (III) and (IV) include, but are not limited to, hydroquinone, resorcinol, 4,4'-dihydroxydiphenyl, 2,2-bis-(4-hydroxyphenyl)-propane, 2,4-bis-(4-hydroxyphenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl)-cyclohexane, 1,1-bis-(4-hydroxyphenyl)-3,3,5-trimethylcyclohexane, 1,1-bis-(4-hydroxyphenyl)-3,3-dimethylcyclohexane, 1,1-bis-(4-hydroxyphenyl)-3,3,5,5-tetramethylcyclohexane and 1,1-bis-(4-hydroxyphenyl)-2,4,4-trimethylcyclopentane.

Preferred diphenols of the formula (III) include, but are not limited to, 2,2-bis-(4-hydroxyphenyl)-propane and 1,1-bis-(4-hydroxyphenyl)-cyclohexane, and the preferred phenol of the formula (IV) is 1,1-bis-(4-hydroxyphenyl)-3,3,5-trimethylcyclohexane. Mixtures of diphenois can also be employed.

Suitable chain terminators include, for example, phenol, p-tert-butylphenol, long-chain alkylphenols, such as 4-(1,3-tetramethyl-butyl)phenol according to DE-OS 2 842 005, and monoalkylphenols and dialkylphenols having a total of 8 to 20 C atoms in the alkyl substituents according to DE-OS 3 506 472, such as p-nonylphenol, 2,5-di-tert-butylphenol, p-tert-octylphenol, p-dodecylphenol, 2-(3,5-dimethylheptyl)-phenol and 4-(3,5-dimethylheptyl)-phenol. The amount of chain terminators required is in general 0.5 to 10 mol %, based on the sum of the diphenols (III) and (IV).

Suitable polycarbonates or polyester-carbonates can be linear or branched. Branched products are preferably obtained by incorporation of 0.05 to 2.0 mol %, based on the sum of the diphenols employed, of compounds which are trifunctional or more than trifunctional, e.g., those with three or more than three phenolic OH groups.

Suitable polycarbonates or polyester-carbonates can contain aromatically bonded halogen, preferably bromine and/or chlorine; they are preferably halogen-free.

The polycarbonates or polyester-carbonates typically have average molecular weights ($\overline{M}_w$, weight-average), determined by, for example, ultracentrifugation or scattered light measurement, of 10,000 to 200,000, preferably 20,000 to 80,000.

Suitable thermoplastic polyesters are, preferably, polyalkylene terephthalates, i.e. reaction products of aromatic dicarboxylic acids or their reactive derivatives (e.g. dimethyl esters or anhydrides) and aliphatic, cycloaliphatic or arylaliphatic diols, and mixtures of such reaction products.

Preferred polyalkylene terephthalates can be prepared by known methods from terephthalic acids (or their reactive derivatives) and aliphatic or cycloaliphatic diols having 2 to 10 C atoms (Kunststoff-Handbuch [Plastics Handbook], volume VIII, p. 695 et seq., Carl Hanser Verlag, Munich 1973).

In preferred polyalkylene terephthalates, 80 to 100, preferably 90 to 100 mol % of the dicarboxylic acid radicals are terephthalic acid radicals and 80 to 100, preferably 90 to 100 mol % of the diol radicals are ethylene glycol and/or butane-1,4-diol radicals.

Preferred polyalkylene terephthalates can contain, in addition to radicals of ethylene glycol or butane-1,4-diol, 0 to 20 mol % of radicals of other aliphatic diols having 3 to 12 C atoms or cycloaliphatic diols having 6 to 12 C atoms, e.g., radicals of propane-1,3-diol, 2-ethylpropane-1,3-diol, neopentylglycol, pentane-1,5-diol, hexane-1,6-diol, cyclohexane-1,4-dimethanol, 3-methyl pentane-1,3-diol and -1,6-diol, 2-ethylhexane-1,3-diol, 2,2-diethylpropane-1,3-diol, hexane-2,5-diol, 1,4-di(β-hydroxyethoxy)-benzene, 2,2-bis-(4-hydroxycyclohexyl)-propane, 2,4-dihydroxy-1,1,3,3-tetramethyl-cyclobutane, 2,2-bis-(3-β-hydroxyethoxyphenyl)-propane and 2,2-bis-(4-hydroxypropoxyphenyl)-propane (DE-OS 2 407 647, 2 407 776 and 2 715 932).

The polyalkylene terephthalates can be branched by incorporation of relatively small amounts of 3- or 4-hydric alcohols or 3- or 4-basic carboxylic acids, such as are described in DE-A 1 900 270 and U.S. Pat. No. 3,692,744. Examples of preferred branching agents are trimesic acid, trimellitic acid, trimethylolethane and -propane and pentaerythritol. Typically, less than 1 mol % of the branching agent, based on the acid component, is used.

Polyalkylene terephthalates which have been prepared solely from terephthalic acid and reactive derivatives thereof (e.g. dialkyl esters thereof) and ethylene glycol and/or butane-1,4-diol and mixtures of these polyalkylene terephthalates are particularly preferred.

Copolyesters which are prepared from at least two of the abovementioned alcohol components are also preferred polyalkylene terephthalates; particularly preferred copolyesters are poly-(ethylene glycol/butane-1,4-diol) terephthalates.

The polyalkylene terephthalates in general have an intrinsic viscosity of 0.4 to 1.5 dl/g, preferably 0.5 to 1.3 dl/g, in particular 0.6 to 1.2 dl/g, in each case measured in phenol/o-dichlorobenzene (1:1 parts by wt.) at 25° C.

Suitable polyamides include known homopolyamides, copolyamides and mixtures of these polyamides. These can be partly crystalline and/or amorphous polyamides.

Suitable partly crystalline polyamides include, but are not limited to, polyamide 6, polyamide 6,6 and mixtures and corresponding copolymers of these components. Partly crystalline polyamides in which the acid component consists completely or partly of terephthalic acid and/or isophthalic acid and/or suberic acid and/or sebacic acid and/or azelaic acid and/or adipic acid and/or cyclohexanedicarboxylic acid and the diamine component consists completely or partly of m- and/or p-xylylene-diamine and/or hexamethylenediamine and/or 2,2,4-trimethylhexamethylenediamine and/or 2,4,4-trimethylhexamethylene-diamine and/or isophoronediamine and the composition of which is known in principle are furthermore possible.

Polyamides which are prepared entirely or partly from lactams having 7–12 C atoms in the ring, optionally with the co-use of one or more of the abovementioned starting components, are also to be mentioned.

Particularly preferred partly crystalline polyamides are polyamide 6 and polyamide 6,6 and their mixtures. Known products can be employed as amorphous polyamides. They are obtained by polycondensation of diamines, such as ethylenediamine, hexamethylenediamine, decamethylenediamine, 2,2,4- and/or 2,4,4-trimethylhexamethylenediamine, m- and/or p-xylylene-diamine, bis-(4-aminocyclohexyl)-methane, bis-(4-aminocyclohexyl)-propane, 3,3'-dimethyl-4,4'-diamino-dicyclohexylmethane, 3-aminomethyl-3,5,5-trimethylcyclohexylamine, 2,5- and/or 2,6-bis-(aminomethyl)-norbornane and/or 1,4-diaminomethyl-cyclohexane, with dicarboxylic acids, such as oxalic acid, adipic acid, azelaic acid, decanedicarboxylic acid, heptadecanedicarboxylic acid, 2,2,4- and/or 2,4,4-trimethyladipic acid, isophthalic acid and terephthalic acid.

Copolymers which are obtained by polycondensation of several monomers are also suitable, and furthermore copolymers which are prepared with the addition of aminocarboxylic acids, such as ε-aminocaproic acid, ω-aminoundecanoic acid or ω-aminolauric acid or their lactams.

Particularly suitable amorphous polyamides include the polyamides prepared from isophthalic acid, hexamethylenediamine and further diamines, such as 4,4'-diaminodicyclohexylmethane, isophoronediamine, 2,2,4- and/or 2,4,4-trimethylhexamethylenediamine or 2,5- and/or 2,6-bis-(aminomethyl)-norbornene; or from isophthalic acid, 4,4'-diamino-dicyclohexylmethane and ε-caprolactam; or from isophthalic acid, 3,3'-dimethyl-4,4'-diamino-dicyclohexylmethane and lauryllactam; or from terephthalic acid and the isomer mixture of 2,2,4- and 2,4,4-trimethylhexamethylenediamine.

Instead of pure 4,4'-diaminodicyclohexylmethane, it is also possible to employ mixtures of the position isomer diaminodicyclohexylmethanes which are composed of: 70 to 99 mol % of the 4,4'-diamino isomer; 1 to 30 mol % of the 2,4'-diamino isomer; 0 to 2 mol % of the 2,2'-diamino isomer; and optionally diamines with a correspondingly higher degree of condensation which are obtained by hydrogenation diaminodiphenylmethane of technical-grade quality. Up to 30% of the isophthalic acid can be replaced by terephthalic acid.

The polyamides preferably have a relative viscosity (measured on a 1 wt. % solution in m-cresol at 25° C.) of 2.0 to 5.0, particularly preferably 2.5 to 4.0.

The compositions can furthermore comprise polymers other than the graft polymers according to the invention.

The graft polymers according to the invention are typically employed in amounts of 1 to 80 wt. %, preferably in amounts of 5 to 50 wt. %, in each case based on the total weight of the composition.

For the preparation of molding compositions, the elastic-thermoplastic graft polymer according to the invention can be mixed with the matrix resin in various ways. If the matrix resin is prepared by emulsion polymerization, the latices can be mixed and precipitated out together, or they can also be precipitated out separately and the resulting solid substances can be mixed.

In the case where the matrix resin is prepared by solution or bulk polymerization, the graft polymer must be precipitated out separately. Known processes are used for this purpose, for example addition of salts and/or acids, after which the precipitated products are washed, dried and optionally converted from the powder form into a granule form. Possible mixing device for precipitated products or granules are e.g., multiple roll mills, mixing extruders or internal kneaders.

Optional additives, such as antioxidants, UV stabilizers, peroxide destroyers, antistatics, lubricants, mold release agents, flameproofing agents, fillers or reinforcing substances (e.g., glass fibres, carbon fibres etc.) or coloring agents, can be added to the molding compositions according to the invention during preparation, working up, further processing and/or final shaping.

The final shaping of the molded article can be carried out on commercially available processing units which include, for example, injection molding processing, sheet extrusion with optionally subsequent thermoforming, cold forming, extrusion of pipes and profiles and calendar processing.

The present invention is more particularly described in the following examples, which are intended to be illustrative only, since numerous modifications and variations therein will be apparent to those skilled in the art. Unless otherwise specified, all parts and percentages are by weight.

EXAMPLES

Examples 1 to 5

58 parts by wt. (calculated as the solid) of a polybutadiene latex mixtures (50 wt. % with an average particle diameter $d_{50}$ of 398 nm and a gel content of 83 wt. % and 50 wt. % with an average particle diameter $d_{50}$ of 282 nm and a gel content of 58 wt. %, both prepared by free-radical polymerization) are brought to a solids content of approx. 20 wt. % with water. Thereafter, the mixture is heated to 59° C. and 0.5 part by wt. $K_2S_2O_8$ (dissolved in water) is added. 42 parts by wt. of a monomer mixture (wt. ratio of styrene:acrylonitrile=73:27) and 1.5 parts by wt. (calculated as the solids substance) of the sodium salt of a resin acid mixture (Dresinate 731, Abieta Chemie GmbH, Gersthofen), dissolved in water which has been rendered alkaline, are then metered into the mixture in parallel in the course of 6 hours.

0.12 part by wt. tert-dodecylmercaptan, as the molecular weight regulator, are metered in together with the monomer mixture such that the weight ratios of monomer: molecular weight regulator stated in table 1 are adhered to.

The reaction temperature is raised to 82° C. in the course of 6 hours, after which a 4-hour after-reaction time at this temperature follows. After addition of approx. 1 part by wt. of a phenolic antioxidant, coagulation is carried out with a magnesium sulfate/acetic acid mixture and, after washing with water, the resulting powder is dried at 70° C.

Examples 6 to 8

50 parts by wt. (calculated as the solid) of a polybutadiene latex with an average particle diameter $d_{50}$ of 127 nm and a gel content of 90 wt. % (prepared by free-radical polymerization) are brought to a solids content of approx. 20 wt. % with water. Thereafter, the mixture is heated to 59° C. and 0.5 part by wt. $K_2S_2O_8$ (dissolved in water) is added. 50 parts by wt. of a monomer mixture (wt. ratio of styrene:acrylonitrile=73:27) and 1.5 parts by wt. (calculated as the solid) of the sodium salts of a resin acid mixture (Dresinate 731, Abieta Chemie GmbH, Gersthofen), dissolved in water which has been rendered alkaline, are then metered into the mixture in parallel in the course of 6 hours.

0.1 part by wt. tert-dodecylmercaptan, as the molecular weight regulator, is metered in together with the monomer mixture such that the weight ratios of monomer: molecular weight regulator stated in table 1 are adhered to. The reaction temperature is raised to 82° C. in the course of 6 hours, after which a 4-hour after-reaction time at this temperature follows. After addition of approx. 1 part by wt. of a phenolic antioxidant, coagulation is carried out with a magnesium sulfate/acetic acid mixture and, after washing with water, the resulting powder is dried at 70° C.

kneader and the mixture is then processed to test specimens (see table 2).

b) 15 parts by wt. of the graft powder obtained according to examples 1 to 5 and 15 parts by wt. of the graft powder obtained according to examples 6 to 8 (see table 2) are mixed with 70 parts by wt. of a styrene/acrylonitrile= 72:28 copolymer resin ($\overline{M}_w \approx 85{,}000$), 2 parts by wt. ethylenediaminebisstearylamide and 0.1 part by wt. of a silicone oil in an internal kneader and the mixture is then processed to test specimens.

The following data were determined.

Notched impact strength at room temperature ($a_k^{RT}$) and at −40° C. ($a_k^{-40°\,C.}$) in accordance with ISO 180/1A (unit: $kJ/m^2$), MVR according to DIN 53735 U (unit: $cm^3/10\,min$).

The odor properties as a measure of complete incorporation of the compound which regulates the molecular weight

TABLE 1

Reaction conditions for the preparation of the elastic-thermoplastic graft polymers

| Example no. | Regulator-free reaction section at the start of the reaction (duration based on the total reaction time [%]) | Wt. ratio of monomer: molecular weight regulator 1st reaction section (duration based on reaction sections 1 to 3 [%]) | Wt. ratio of monomer: molecular weight regulator 2nd reaction section (duration based on reaction sections 1 to 3 [%]) | Wt. ratio of monomer: molecular weight regulator 3rd reaction section (duration based on reaction sections 1 to 3 [%]) | Regulator-free reaction section at the end of the reaction (duration based on the total reaction time [%]) |
|---|---|---|---|---|---|
| 1 | no | 175 (50) | 233 (25) | 700 (25) | yes (33) |
| 2 | no | 140 (20) | 233 (40) | 700 (40) | yes (17) |
| 3 | yes (8) | 200 (56) | 350 (22) | 560 (22) | yes (17) |
| 4 (comparison) | no | 350 (100) | | | no |
| 5 (comparison) | no | 700 (25) | 233 (25) | 175 (50) | yes (33) |
| 6 | no | 238 (50) | 417 (25) | 833 (25) | yes (33) |
| 7 | yes (17) | 238 (950) | 417 (25) | 833 (25) | yes (17) |
| 8 (comparison) | no | 502 (100) | | | no |

Testing of the Graft Polymer Powder a) 40 parts by wt. of the graft powder obtained according to examples 1 to 5 are mixed with 60 parts by wt. of a styrene/acrylonitrile=72:28 copolymer resin ($\overline{M}_w \approx 115{,}000$), 2 parts by wt. ethylenediaminebisstearylamide and 0.1 part by wt. of a silicone oil in an internal are evaluated on freshly injection-molded moldings in accordance with the grading ++ no perceptible smell + scarcely perceptible smell o faint smell

- significant smell

-- strong smell.

TABLE 2

Compositions of the moldings mixtures

| Example no. | Graft polymer from example 1 (parts by wt.) | Graft polymer from example 2 (parts by wt.) | Graft polymer from example 3 (parts by wt.) | Graft polymer from example 4 (parts by wt.) | Graft polymer from example 5 (parts by wt.) | Graft polymer from example 6 (parts by wt.) | Graft polymer from example 7 (parts by wt.) | Graft polymer from example 8 (parts by wt.) | Styrene/ acrylonitrile copolymer $\overline{M}_w \approx$ 115,000 (parts by wt.) | Styrene/ acrylonitrile copolymer $\overline{M}_w \approx$ 85,000 (parts by wt.) |
|---|---|---|---|---|---|---|---|---|---|---|
| 9 | 40 | — | — | — | — | — | — | — | 60 | — |
| 10 | — | 40 | — | — | — | — | — | — | 60 | — |
| 11 | — | — | 40 | — | — | — | — | — | 60 | — |
| 12 (comp.) | — | — | — | 40 | — | — | — | — | 60 | — |
| 13 (comp.) | — | — | — | — | 40 | — | — | — | 60 | — |
| 14 | 15 | — | — | — | — | 15 | — | — | — | 70 |
| 15 | — | 15 | — | — | — | — | 15 | — | — | 70 |
| 16 (comp.) | — | — | — | 15 | — | — | — | 15 | — | 70 |

TABLE 3

Testing of the molding compositions

| Example no. | $a_k^{RT}$ (kJ/m$^2$) | $a_k^{-40° C.}$ (kJ/m$^2$) | MVR (cm$^3$/10 min) | Odour properties |
|---|---|---|---|---|
| 9 | 36.2 | 24.0 | 9.3 | ++ |
| 10 | 37.2 | 24.4 | 9.5 | + |
| 11 | 36.5 | 25.9 | 9.3 | ○ |
| 12 (comparison) | 35.3 | 23.5 | 9.0 | -- |
| 13 (comparison) | 34.4 | 23.0 | 8.8 | - |
| 14 | 19.0 | 10.9 | 36.6 | ++ |
| 15 | 18.1 | 10.5 | 37.3 | + |
| 16 (comparison) | 16.4 | 9.9 | 36.6 | -- |

The test values stated in Table 3 show that the elastic-thermoplastic graft polymers prepared according to the invention lead to rubber-modified thermoplastic molding compositions with improved values for toughness and thermoplastic processability and significantly more favorable odor properties.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An elastic-thermoplastic graft polymer prepared by a multi-stage free radical polymerization of (I) one or more monomers containing vinyl groups, and (ii) at least one molecular weight regulating compound, in the presence of (iii) at least one rubber in latex form comprising an emulsifier, wherein, in a first reaction stage of the polymerization, the ratio of monomers to the molecular weight regulating compound is from 50:1 to 400:1;

in a second reaction stage of the polymerization, the ratio of monomers to the molecular weight regulating compound is from 100:1 to 800:1;

in a third reaction stage of the polymerization, the ratio of monomers to the molecular weight regulating compound is from 200:1 to 2000:1; and in at least one further reaction stage of the polymerization, the monomers, in the absence of the molecular weight regulating compound, are polymerized in the presence of the rubber, said further reaction stage occurring at a point selected from at least one of before the first stage and after the third stage, provided that the ratio of monomers to the molecular weight regulating compound in the first stage is less than or equal to the ratio of monomers to the molecular weight regulating compound in the second stage, and the ratio of monomers to the molecular weight regulating compound in the second stage is less than the ratio of monomers to the molecular weight regulating compound in the third stage.

2. The elastic-thermoplastic graft polymer of claim 1 wherein, in the first reaction stage of the polymerization, the ratio of monomers to the molecular weight regulating compound is from 100:1 to 300:1, in the second reaction stage of the polymerization, the ratio of monomers to the molecular weight regulating compound is from 200:1 to 600:1, and in the third reaction stage of the polymerization, the ratio of monomers to the molecular weight regulating compound is from 400:1 to 1500:1.

3. The elastic-thermoplastic graft polymer of claim 1 wherein the molecular weight regulating compound is a sulfur-containing compound.

4. A composition comprising the elastic-thermoplastic graft polymer of claim 1.

5. The composition of claim 4 comprising at least one copolymer prepared from monomers selected from at least two of styrene, acrylonitrile, α-methylstyrene, methyl methacrylate and N-phenylmaleimide.

6. The composition of claim 4 comprising at least one thermoplastic resin selected from thermoplastic polycarbonates, thermoplastic polyester-carbonates, thermoplastic polyesters, thermoplastic polyamides and mixtures thereof.

7. The composition of claim 4 wherein said elastic-thermoplastic graft polymer is present in an amount of from 1 to 80 percent by weight.

8. A method of using the composition of claim 4 to prepare shaped articles.

9. A shaped article prepared from the composition of claim 4.

10. A multi-stage process of preparing an elastic-thermoplastic graft polymer comprising polymerizing free radically (i) one or more monomers containing vinyl groups, and (ii) at least one molecular weight regulating compound, in the presence of (iii) at least one rubber in latex form, wherein, in a first reaction stage of the polymerization, the ratio of monomers to the molecular weight regulating compound is from 50:1 to 400:1;

in a second reaction stage of the polymerization, the ratio of monomers to the molecular weight regulating compound is from 100:1 to 800:1;

in a third reaction stage of the polymerization, the ratio of monomers to the molecular weight regulating compound is from 200:1 to 2000:1; and in at least one further reaction stage of the polymerization, the monomers, in the absence of the molecular weight regulating compound, are polymerized in the presence of the rubber, said further reaction stage occurring at a point selected from at least one of before the first stage and after the third stage, provided that the ratio of monomers to the molecular weight regulating compound in the first stage is less than or equal to the ratio of monomers to the molecular weight regulating compound in the second stage, and the ratio of monomers to the molecular weight regulating compound in the second stage is less than the ratio of monomers to the molecular weight regulating compound in the third stage.

11. The process of claim 10 wherein, in the first reaction stage of the polymerization, the ratio of monomers to the molecular weight regulating compound is from 100:1 to 300:1, in the second reaction stage of the polymerization, the ratio of monomers to the molecular weight regulating compound is from 200:1 to 600:1, and in the third reaction stage of the polymerization, the ratio of monomers to the molecular weight regulating compound is from 400:1 to 1500:1.

12. The process of claim 10 wherein the molecular weight regulating compound is a sulfur-containing compound.

* * * * *

UNITED STATES PATENT AND TRADEMARK OFFICE
CERTIFICATE OF CORRECTION

PATENT NO. : 6,569,951 B2
DATED : May 27, 2003
INVENTOR(S) : Herbert Eichenauer, Hans-Erich Gasche and Ulrich Jansen It is certified that error appears in the above-identified patent and that said Letters Patent is hereby corrected as shown below:

Column 5,
Line 33, delete "molectular" and insert -- molecular --.

Column 13,
Line 29, delete "(I)" and insert -- (i) --.

Signed and Sealed this

Twenty-second Day of July, 2003

JAMES E. ROGAN
*Director of the United States Patent and Trademark Office*